US008168320B2

(12) United States Patent
Takagi et al.

(10) Patent No.: US 8,168,320 B2
(45) Date of Patent: May 1, 2012

(54) SECONDARY BATTERY

(75) Inventors: Kumiko Takagi, Fukushima (JP);
Fumiko Hashimoto, Fukushima (JP);
Akira Yamaguchi, Fukushima (JP);
Yuzuru Fukushima, Miyagi (JP);
Hiroshi Inoue, Fukushima (JP);
Yasufumi Minato, Saitama (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 12/842,539

(22) Filed: Jul. 23, 2010

(65) Prior Publication Data

US 2010/0291425 A1 Nov. 18, 2010

Related U.S. Application Data

(63) Continuation of application No. 11/746,736, filed on May 10, 2007, now Pat. No. 7,807,292.

(30) Foreign Application Priority Data

May 17, 2006 (JP) ................... 2006-138166

(51) Int. Cl.
*H01M 6/12* (2006.01)
(52) U.S. Cl. .................. 429/162; 429/163; 429/164
(58) Field of Classification Search .................. None
See application file for complete search history.

(56) References Cited

U.S. PATENT DOCUMENTS

| 6,949,312 B1 | 9/2005 | Kawakami et al. | |
|---|---|---|---|
| 2003/0180605 A1* | 9/2003 | Mizutani | 429/94 |
| 2005/0175892 A1* | 8/2005 | Mizutani | 429/164 |
| 2006/0008701 A1* | 1/2006 | Kim et al. | 429/161 |
| 2006/0099515 A1* | 5/2006 | Yamaguchi et al. | 429/338 |

FOREIGN PATENT DOCUMENTS

| JP | 08-315825 | 11/1996 |
|---|---|---|
| JP | 2001-216997 | 8/2001 |
| JP | 2003-109669 | 4/2003 |
| JP | 2003-257406 | 9/2003 |
| JP | 2004-022306 | 1/2004 |
| JP | 2004-063400 | 2/2004 |
| JP | 2005-078999 | 3/2005 |
| JP | 2005-196974 | 7/2005 |
| JP | 2005-222884 | 8/2005 |
| JP | 2006-012813 | 1/2006 |
| JP | 2006-107792 | 4/2006 |

(Continued)

OTHER PUBLICATIONS

Ou Mao et al., Mechanically Alloyed Sn-fe(-C) Powders as Anode Materials for Li-Ion Batteries, Journal of the Electrochemical Society, 1999; No. 146; p. 405.

(Continued)

*Primary Examiner* — Cynthia Lee
(74) *Attorney, Agent, or Firm* — SNR Denton US LLP

(57) ABSTRACT

A battery including: a spirally wound electrode body in which a cathode having a cathode active material layer on a strip-shaped cathode current collector and an anode having an anode active material layer on a strip-shaped anode current collector are layered with a separator in between, and spirally wound in a planular state; and a lead joined to the cathode current collector or the anode current collector in a center portion of the spirally wound electrode body. An inner circumferential end of the cathode active material layer is provided in a region where the inner circumferential end does not overlap with the lead in a short axis direction of the spirally wound electrode body.

9 Claims, 10 Drawing Sheets

FOREIGN PATENT DOCUMENTS

| | | |
|---|---|---|
| JP | 2005-353582 | 12/2006 |
| JP | 2003-086233 | 3/2010 |
| WO | WO2006049167 | 5/2006 |

OTHER PUBLICATIONS

Ou Mao et al., Mechanically Alloyed Sn-fe(–C) Powders as Anode Materials for Li-Ion Batteries, Journal of the Electrochemical Society, 19999; No. 146; p. 414.

Ou Mao et al., Mechanically Alloyed Sn-fe(–C) Powders as Anode Materials for Li-Ion Batteries, Journal of the Electrochemical Society, 1999, No. 146, p. 423.

Hansu Kim et al., The Insertion Mechanism of Lithium into Mg2Si Anode Material for Li-Ion Batteries, Journal of the Electrochemical Society, 1999, No. 146, p. 4401.

\* cited by examiner

SECONDARY BATTERY

RELATED APPLICATION DATA

This application is a continuation of U.S. patent application Ser. No. 11/746,736, filed May 10, 2007, the entirety of which is incorporated herein by reference to the extent permitted by law. The present application also claims priority to Japanese Patent Application No. JP 2006-138166 filed in the Japanese Patent Office on May 17, 2006, which is incorporated herein by reference in its entirety to the extent permitted by law.

BACKGROUND OF THE INVENTION

1. Field of the Invention

The present invention relates to a secondary battery that includes a spirally wound electrode body in which a cathode and an anode are layered with an electrolyte in between and spirally wound.

2. Description of the Related Art

In recent years, many portable electronic devices such as a combination camera (Videotape Recorder), a mobile phone, and a notebook personal computer have been introduced, and downsizing and weight saving of such devices have been made. Research and development for improving the energy density of the battery used as a portable power source for such electronic devices, in particular the secondary battery as a key device has been actively promoted. Specially, a nonaqueous electrolyte secondary battery (for example, lithium ion secondary battery) provides the higher energy density compared to a lead battery or a nickel cadmium battery as an existing aqueous electrolytic solution secondary battery. Therefore, improvement thereof has been considered in respective fields.

As an anode active material used for the lithium ion secondary battery, carbon materials such as non-graphitizable carbon and graphite, which show the relatively high capacity and the favorable cycle characteristics, have been widely used. However, taking account of the demand for the high capacity in these years, it is a task to obtain the higher capacity of the carbon material.

From such a background, a technique for attaining the high capacity with the use of the carbon material by selecting a carbonized raw material and preparation conditions has been developed (for example, refer to Japanese Unexamined Patent Application Publication No. 8-315825). However, in the case that such a carbon material is used, the anode discharge potential to lithium (Li) is from 0.8 V to 1.0 V, and the battery discharge voltage when forming the battery becomes low, and therefore significant improvement is not expected in terms of the battery energy density. Further, there are disadvantages that hysteresis is large in the shape of a charge and discharge curve, and energy efficiency in each charge and discharge cycle is low.

Meanwhile, as a high-capacity anode exceeding the carbon material, researches on alloy materials have been also promoted. Such alloy materials apply the fact that a certain metal is electrochemically alloyed with lithium, and the alloy is reversibly generated and decomposed. Further, it is considered that, as a method to improve the cycle characteristics, tin and silicon (Si) are alloyed to suppress expansion of tin and silicon. For example, it is proposed that a transition metal such as iron and tin are alloyed (refer to Japanese Unexamined Patent Application Publication Nos. 2004-22306, 2004-63400, and 2005-78999, "Journal of The Electrochemical Society," 1999, Vol. 146, p. 405, p. 414, and p. 423). In addition, $Mg_2Si$ or the like has been suggested (refer to "Journal of The Electrochemical Society," 1999, Vol. 146, p. 4401).

SUMMARY OF THE INVENTION

However, even in the cases using the foregoing methods, it is difficult to sufficiently suppress expansion and shrinkage of the anode in charge and discharge. Therefore, in the result, it is an actual situation that effects of improving cycle characteristics are not obtained, and merits of the high-capacity anode using the alloy material are not sufficiently utilized.

More specifically, for example, when an anode made of the foregoing alloy material is used for a spirally wound electrode body that is contained in a square battery in the shape of an approximate rectangular parallelepiped and its cross section perpendicular to the spirally winding axis is planular, the pressure distribution inside the spirally wound electrode body becomes uneven due to expansion according to charge and discharge. In a portion with the high pressure, there is a possibility that a separator is compressed and thus slight short-circuit is generated. Meanwhile, in a portion with the low pressure, a clearance between electrodes becomes large and thus lithium is precipitated. In the result, there is a possibility that the load characteristics and the charge and discharge cycle characteristics are deteriorated. Further, when the spirally wound electrode body is inserted in a battery can with the low rigidity, there is a possibility that the anode is expanded and thus the battery can is pressed from inside and deformed.

In view of the foregoing, in the invention, it is desirable to provide a secondary battery in which while the sufficient capacity is secured, the pressure inside the spirally wound electrode body is uniformed, and the superior charge and discharge cycle characteristics could be obtained.

According to an embodiment of the invention, there is provided a first secondary battery including: a spirally wound electrode body in which a cathode having a cathode active material layer on a strip-shaped cathode current collector and an anode having an anode active material layer on a strip-shaped anode current collector are layered with a separator in between, and spirally wound in a planular state; and a lead jointed to the cathode current collector or the anode current collector in a center portion of the spirally wound electrode body. An inner circumferential end of the cathode active material layer is provided in a region where the inner circumferential end does not overlap with the lead in a short axis direction of the spirally wound electrode body. That is, the inner circumferential end of the cathode active material layer and the lead do not overlap with each other in the short axis direction, and are departed from each other along the long axis direction.

In the first secondary battery of the embodiment of the invention, the most inner circumferential portion of the cathode active material layer is provided in the region where the most inner circumferential portion does not overlap with the region where the lead is formed in the short axis direction of the cross section. Therefore, compared to the case that the cathode active material layer is provided in a region where the cathode active material layer overlaps with the lead in the short axis direction, pressure rise particularly in the region where the lead is formed due to expansion of the anode facing the cathode in the most inner circumference is eased. In the result, deviation of the pressure distribution inside the spirally wound electrode body is hardly caused.

According to an embodiment of the invention, there is provided a second secondary battery including: a spirally wound electrode body in which a cathode having a cathode active material layer on a strip-shaped cathode current collector and an anode having an anode active material layer on a strip-shaped anode current collector are layered with a separator in between, and spirally wound in a planular state; a cathode lead jointed to the cathode current collector; and an anode lead jointed to the anode current collector. The spirally wound electrode body is structured so that a spirally winding center side end and a spirally winding outer circumferential side end of the cathode active material layer are located on one side of two regions divided by a long axis, and a flat portion having the spirally winding center side end of the cathode active material layer and a flat portion having the spirally winding outer circumferential side end of the cathode active material layer do not overlap with each other in a short axis direction. That is, the flat portion having the spirally winding center side end of the cathode active material layer and the flat portion having the spirally winding outer circumferential side end of the cathode active material layer do not overlap with each other when viewed in the short axis direction, and departed from each other in the long axis direction. The flat portion means a portion extending approximately linearly along the long axis direction.

The second secondary battery of the embodiment of the invention is structured as above. Therefore, compared to the case that the spirally winding center side end of the cathode active material layer and the spirally winding outer circumferential side end of the cathode active material layer are provided to overlap with each other in the short axis direction of the cross section, deviation of the pressure distribution inside the spirally wound electrode body due to expansion of the anode facing the cathode is hardly caused. The main reason thereof is that stress concentration in the vicinity of the end on the spirally winding center side and in the vicinity of the end on the spirally winding outer circumferential side in the cathode active material layer is relaxed.

According to the secondary battery of the embodiment of the invention, in the short axis direction of the cross section, the inner circumferential portion of the cathode active material layer and the lead do not overlap with each other, or the spirally winding center side end and the spirally winding outer circumferential side end of the cathode active material layer do not overlap with each other. Therefore, deviation of the pressure distribution inside the spirally wound electrode body can be prevented from being generated. In the result, deterioration of the load characteristics and the charge and discharge cycle characteristics due to precipitation of lithium can be prevented. Consequently, by using an alloy material as an anode active material, the sufficient capacity can be secured, and the charge and discharge cycle characteristics can be improved.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings. For each element in the figures, the shape, the size, and the arrangement relation are schematically shown to the degree with which the invention can be understood, and the shape, the size, and the arrangement relation in the figures are different from those actually used.

First Embodiment

Figure 1:
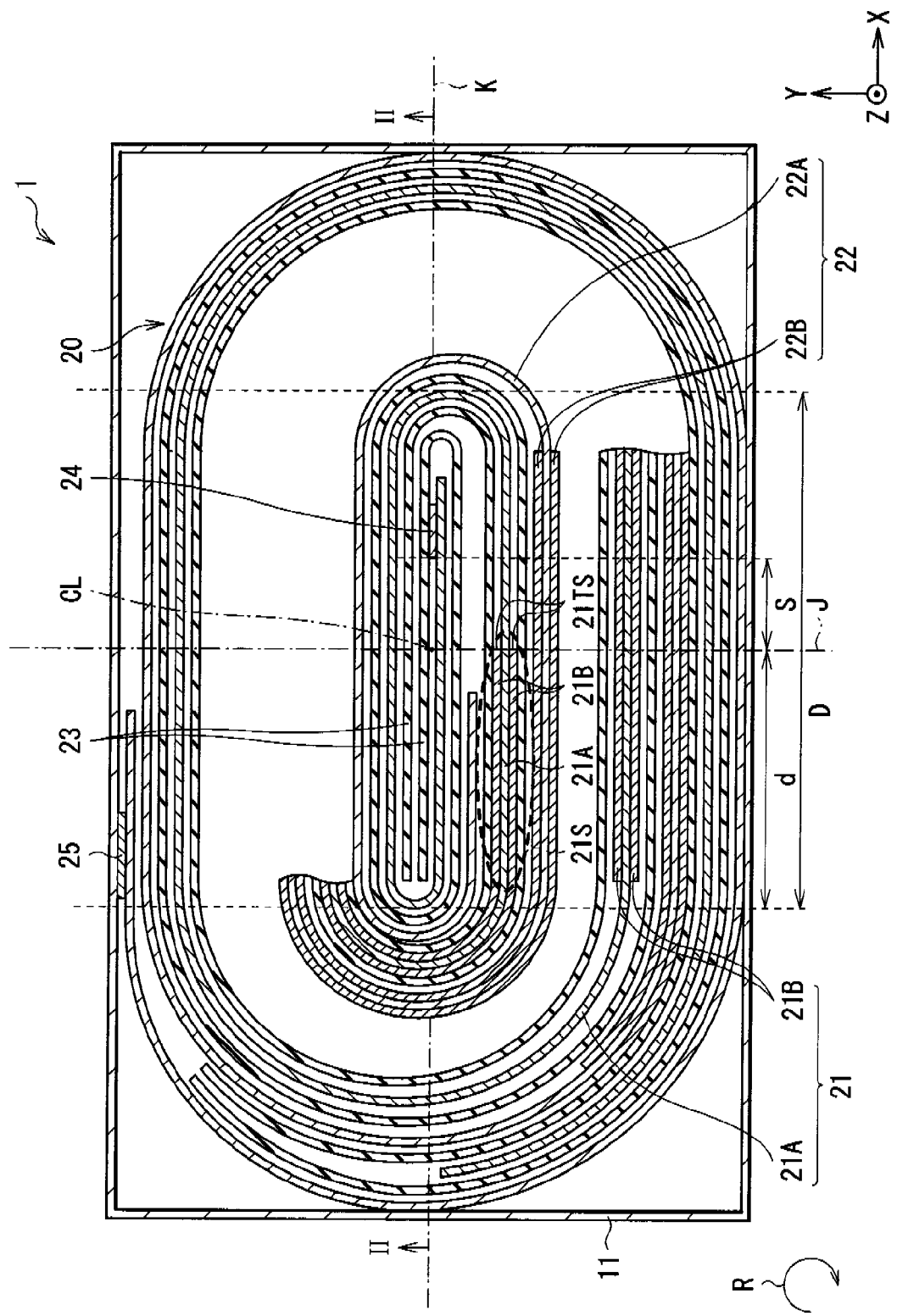
FIG. 1 is a cross section showing a structure of a secondary battery 1 according to a first embodiment of the invention.
Figure 2:
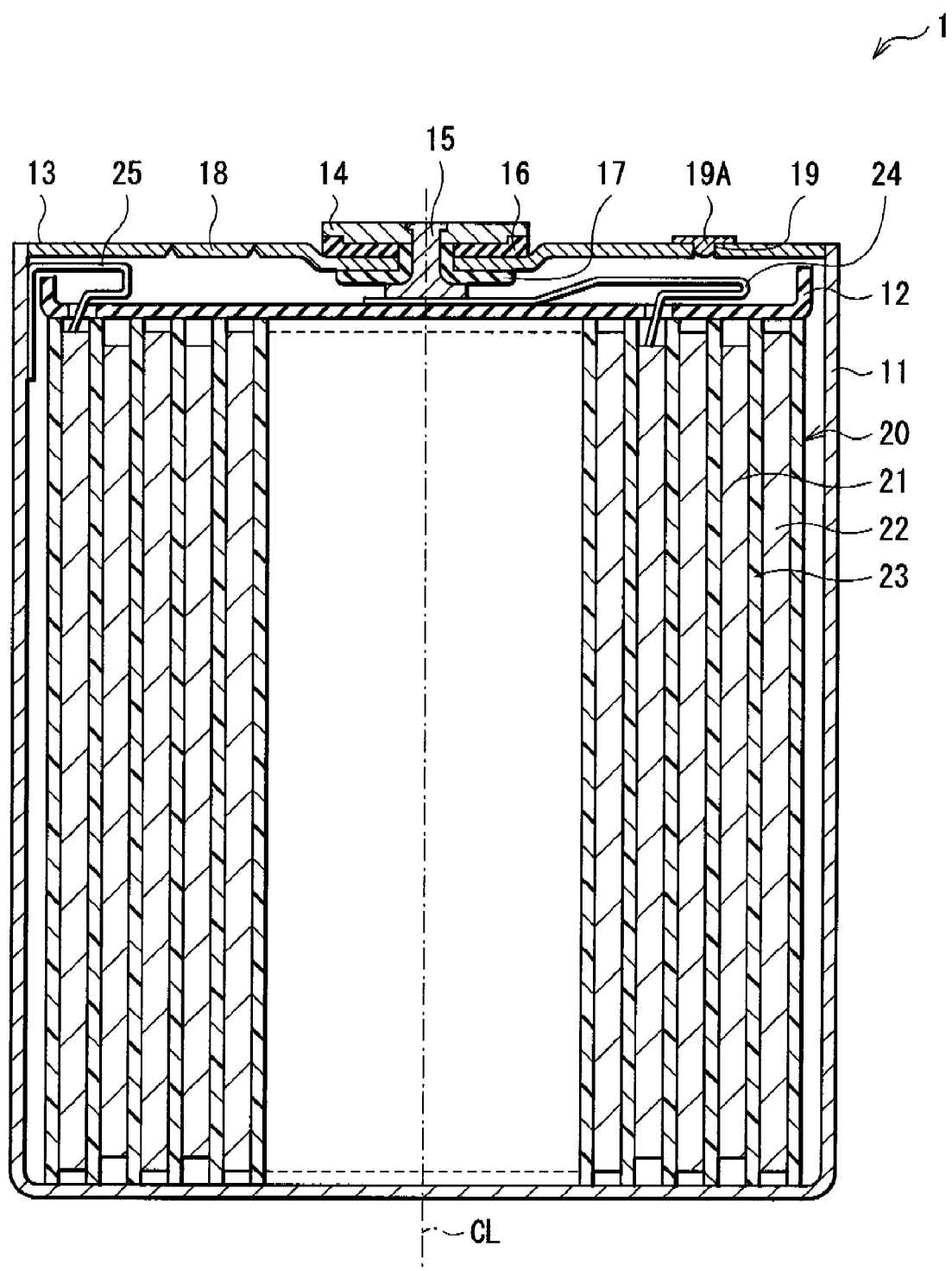
FIG. 2 is a cross section showing a structure taken along line II-II of the secondary battery 1 shown in FIG. 1.

FIG. 1 and FIG. 2 show a cross sectional structure of a secondary battery 1 as a first embodiment of the invention. The secondary battery 1 is a so-called square secondary battery, and contains a planular spirally wound electrode body 20 inside a battery can 11 in the shape of an approximately hollow rectangular parallelepiped. The spirally wound electrode body 20 is a lamination film including a plurality of layers as described later, and is obtained by spirally winding the lamination film centering on a spirally winding axis CL. FIG. 1 shows a structure of a cross section perpendicular to the spirally winding axis CL. FIG. 2 shows a structure of a cross section cut taken along the long axis direction including the spirally winding axis CL. That is, FIG. 2 is a cross section in the arrow direction taken along line II-II shown in FIG. 1.

The battery can 11 is made of, for example, iron (Fe) plated by nickel (Ni). The battery can 11 also has a function as an anode terminal. One end of the battery can 11 is closed, and the other end thereof is opened. At the open end of the battery can 11, an insulating plate 12 and a battery cover 13 are attached, and thereby inside of the battery can 11 is hermetically closed. The insulating plate 12 is made of polypropylene or the like, and arranged perpendicular to the spirally winding circumferential face on the spirally wound electrode body 20. The battery cover 13 is, for example, made of a material similar to that of the battery can 11, and also has a function as an anode terminal together with the battery can 11. Outside of the battery cover 13, a terminal plate 14 as a cathode terminal is arranged. In the vicinity of the center of the battery cover 13, a through-hole is provided. A cathode pin 15 electrically connected to the terminal plate 14 is inserted in the through-hole. The terminal plate 14 and the battery cover 13 are electrically insulated from each other by an insulating case 16. The cathode pin 15 and the battery cover 13 are electrically insulated from each other by a gasket 17. The insulating case 16 is made of, for example, polybutylene terephthalate. The gasket 17 is made of, for example, an insulating material, and its surface is coated with asphalt.

In the vicinity of the rim of the battery cover 13, a cleavage valve 18 and an electrolytic solution injection hole 19 are provided. The cleavage valve 18 is electrically connected to the battery cover 13. When the internal pressure of the battery becomes a certain level or more by internal short circuit, external heating or the like, the cleavage valve 18 cleaves to prevent rise of the internal pressure. The electrolytic solution injection hole 19 is sealed by a sealing member 19A made of, for example, a stainless corundum.

In the spirally wound electrode body 20, a cathode 21 and an anode 22 are layered with a separator 23 in between. As shown in FIG. 1, the spirally wound electrode body 20 is formed to match with the shape of the battery can 11 in the cross section perpendicular to the spirally winding axis CL, and is planular having the long axis K and the short axis J that are perpendicular to each other. In the figure, the direction of the long axis K is shown as the X direction, and the direction of the short axis J is shown as the Y direction. The spirally wound electrode body 20 is spirally wound from the spirally winding center side to the spirally winding outer circumferential side along the spirally winding direction R indicated by the arrow in FIG. 1. In FIG. 1, part of the spirally wound electrode body 20 is omitted. In FIG. 2, the lamination structure of the cathode 21 and the anode 22 is more simplified. Further, the spirally winding number of the spirally wound electrode body 20 is not limited to that shown in FIG. 2, and can be set arbitrarily. The dimension in the Z axis direction along the spirally winding axis CL is called height. A cathode lead 24 made of aluminum (Al) or the like is connected to the cathode 21 of the spirally wound electrode body 20. An anode lead 25 made of nickel or the like is connected to the anode 22. The cathode lead 24 is electrically connected to the terminal plate 14 by being welded to the lower end of the cathode pin 15. The anode lead 25 is welded and electrically connected to the battery can 11.

Figure 3:
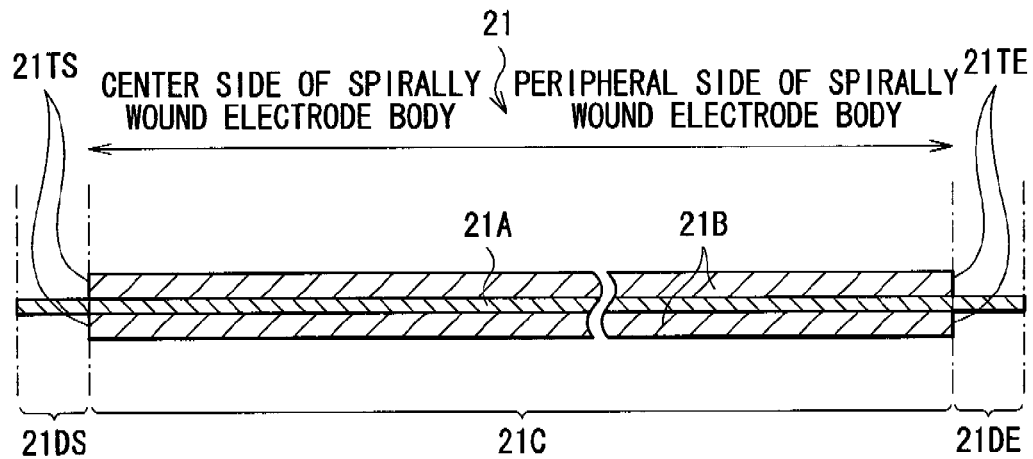
FIG. 3 is a cross section showing a structure of a cathode shown in FIG. 1 before spirally wound.

FIG. 3 shows a laminated cross sectional structure of the cathode 21 before being spirally wound. In the cathode 21, a cathode active material layer 21B is provided on the both faces of a strip-shaped cathode current collector 21A. More specifically, the cathode 21 has a cathode coated region 21C provided with the cathode active material layer 21B on the outer circumferential face side and the inner circumferential face side of the cathode current collector 21A. The next regions of the cathode coated region 21C on both sides, that is, the ends on the spirally winding center side and the spirally winding outer circumferential side of the cathode current collector 21A are respectively cathode exposed regions 21DS and 21DE. In the cathode exposed regions 21DS and 21DE, no cathode active material layer 21B is provided on the both faces of the cathode current collector 21A and the both faces of the cathode current collector 21A are exposed. The positions of the both ends of the cathode coated region 21C are defined by an end face 21TS on the spirally winding center side in the cathode current collector 21A and an end face 21TE on the spirally winding outer circumferential side in the cathode current collector 21A. The cathode lead 24 is jointed to the cathode exposed region 21DS on the spirally winding center side. That is, in a spirally wound state, the inner circumferential end of the cathode active material layer 21B (flat portion 21S) is provided in the region where the flat portion 21S does not overlap with the cathode lead 24 in the direction of the short axis J.

Therefore, as shown in FIG. 1, there is a given spacing S along the long axis K between the end face 21TS and the cathode lead 24. The spacing S is 0 or more, and shorter than the length D along the long axis K in the most inner circumference of the spirally wound cathode current collector 21A. In particular, the following Conditional expression 1 is desirably satisfied.

$$0 \leq S/D \leq 0.7 \qquad 1$$

Due to the foregoing structure, even when the anode 22 is expanded, local rise of the internal pressure of the spirally wound electrode body 20 is eased. For example, when part of the cathode active material layer 21B and the cathode lead 24 are provided in a region where the both overlap with each other in the direction of the short axis J (for example, refer to FIG. 10 described later), as the anode 22 inserting lithium ions from the cathode 21 is expanded, a step is generated in the spirally wound electrode body 20 in the intersection between the joint region of the cathode lead 24 in the most inner circumference and other region. In the result, local internal pressure rise is easily caused. Meanwhile, in this embodiment, the flat portion 21S of the cathode active material layer 21B is provided in the region different from the region of the cathode lead 24 (so that the flat portion 21S does not overlap with the cathode lead 24) in the direction of the short axis J. Therefore, compared to the structure of FIG. 10, pressure rise particularly in the region where the cathode lead 24 is formed is eased, and thus deviation of the pressure distribution inside the spirally wound electrode body 20 is hardly caused.

The cathode current collector 21A is, for example, about 5 μm to 50 μm thick, and is made of a metal foil such as an aluminum foil, a nickel foil, and a stainless foil.

The cathode active material layer 21B contains, for example, as a cathode active material, one or more cathode materials capable of inserting and extracting lithium as an electrode reactant. If necessary, the cathode active material layer 21B may also contain a conductive material such as a carbon material and a binder such as polyvinylidene fluoride. As the cathode material capable of inserting and extracting lithium, for example, a metal sulfide, a metal selenide, or a metal oxide containing no lithium such as titanium sulfide ($TiS_2$), molybdenum sulfide ($MoS_2$), niobium selenide ($NbSe_2$), and vanadium oxide ($V_2O_5$), or a lithium-containing compound containing lithium can be cited.

There are some lithium-containing compounds that can provide the high voltage and the high energy density. As such a lithium-containing compound, for example, a complex oxide containing lithium and a transition metal element, or a phosphate compound containing lithium and a transition metal element can be cited. In particular, a compound containing at least one of cobalt (Co), nickel, and manganese (Mn) is preferable, since such a compound can provide the higher voltage. The chemical formula thereof can be expressed by, for example, $Li_xMIO_2$ or $Li_yMIIPO_4$. In the formulas, MI and MII represent one or more transition metal elements. Values of x and y vary according to charge and discharge states of the battery, and the values of x and y are generally in the range of $0.05 \leq x \leq 1.10$ and $0.05 \leq y \leq 1.10$.

As a specific example of the complex oxide containing lithium and a transition metal element, a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), lithium manganese complex oxide having a spinel structure ($LiMn_2O_4$) or the like can be cited. Specially, the complex oxide containing nickel is preferable, since such a complex oxide containing nickel can provide the high capacity and the superior cycle characteristics. As a specific example of the phosphate compound containing lithium and a transition metal element, for example, lithium iron phosphate compound (LiFePO$_4$) or a lithium iron manganese phosphate compound (LiFe$_{1-y}$Mn$_y$PO$_4$ (v<1)) can be cited.

Figure 4:
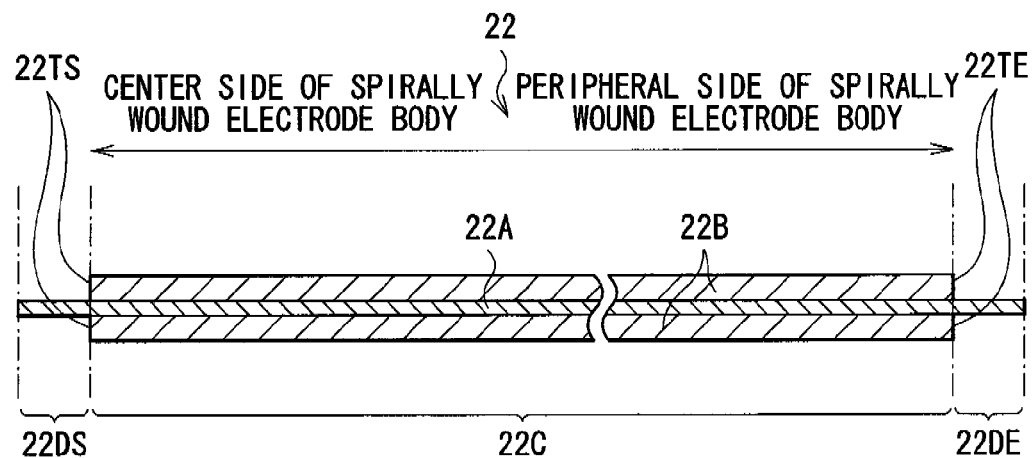
FIG. 4 is a cross section showing a structure of an anode shown in FIG. 1 before spirally wound.

FIG. 4 shows a structure of the anode 22. In the anode 22, an anode active material layer 22B is provided on the both faces of a strip-shaped anode current collector 22A. More specifically, the anode 22 has an anode coated region 22C provided with the anode active material layer 22B on the spirally winding outer circumferential face side and the spirally winding inner circumferential face side of the anode current collector 22A. In addition, the anode 21 has an anode exposed region 22D provided with no anode active material layer 22B on the both faces of the anode current collector 22A and the both faces of the anode current collector 22A are exposed at the ends of the spirally winding center side and the spirally winding outer circumferential side.

The anode current collector 22A is made of, for example, a metal foil such as a copper foil, a nickel foil, and a stainless foil. The anode current collector 22A is, for example, about 5 µm to 50 µm thick.

The anode active material layer 22B contains, for example, an anode active material. If necessary, the anode active material layer 22B may contain other material such as an electrical conductor and a binder. As the anode active material, for example, an anode material that is capable of inserting and extracting lithium as an electrode reactant and contains at least one of metal elements and metalloid elements as an element can be cited. Such an anode material is preferably used, since thereby the high energy density can be obtained. As such an anode material, a simple substance, an alloy, or a compound of metal elements or metalloid elements, or a material having one or more phases thereof at least in part can be cited. In the invention, alloys also include an alloy containing one or more metal elements and one or more metalloid elements, in addition to an alloy including two or more metal elements. Further, an alloy may contain nonmetallic elements. The texture thereof may be a solid solution, a eutectic crystal (eutectic mixture), an intermetallic compound, or a texture in which two or more of the foregoing textures coexist.

As such a metal element or such a metalloid element composing the anode material, for example, a metal element or a metalloid element capable of forming an alloy with lithium can be cited. More specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like can be cited.

Specially, as the anode material, a compound containing a metal element or a metalloid element of Group 14 in the long period periodic table as an element is preferable. A material containing at least one of tin and silicon as an element is particularly preferable. Tin and silicon have a high ability to insert and extract lithium and provide the high energy density. More specifically, for example, a simple substance, an alloy, or a compound of silicon; a simple substance, an alloy, or a compound of tin; or a material having one or more phases thereof at least in part can be cited.

As an alloy of tin, for example, an alloy containing at least one selected from the group consisting of silicon, nickel, copper, iron (Fe), cobalt (Co), manganese (Mn), zinc (Zn), indium (In), silver (Ag), titanium (Ti), germanium (Ge), bismuth (Bi), antimony (Sb), and chromium (Cr) as a second element other than tin can be cited. As an alloy of silicon, for example, an alloy containing at least one selected from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

Specially, as such an anode material, a CoSnC-containing material containing tin, cobalt, and carbon as an element in which the carbon content is from 9.9 wt % to 29.7 wt %, and the ratio of cobalt to the total of tin and cobalt is from 30 wt % to 70 wt % is preferable. In such a composition range, the high energy density can be obtained, and the superior cycle characteristics can be obtained.

The CoSnC-containing material may further contain one or more of other elements hereinafter cited, if necessary. As other element, for example, silicon, iron, nickel, chromium, indium, niobium (Nb), germanium, titanium, molybdenum (Mo), aluminum (Al), phosphorus (P), gallium (Ga), and bismuth can be cited. When such other element is contained, the capacity or the cycle characteristics can be thereby further improved in some cases.

The CoSnC-containing material has a phase containing tin, cobalt, and carbon. The phase preferably has a structure with low crystallinity or an amorphous structure. Further, it is preferable that in the CoSnC-containing material, at least part of carbon as the element is bonded to the metal element or the metalloid element as other element. The reason thereof is as follows. Lowered cycle characteristics may be caused by cohesion or crystallization of tin or the like. Such cohesion or crystallization can be prevented by bonding carbon with other element.

As a measuring method for examining bonding state of the elements, for example, X-ray Photoelectron Spectroscopy (XPS) can be cited. In XPS, in the case of graphite, the peak of 1s orbital of carbon (C1s) is observed at 284.5 eV in the apparatus in which energy calibration is made so that the peak of 4f orbital of gold atom (Au4f) is obtained in 84.0 eV. In the case of surface contamination carbon, the peak is observed at 284.8 eV. Meanwhile, in the case of higher electric charge density of the carbon element, for example, when carbon is bonded to the metal element or the metalloid element, the peak of C1s is observed at the region lower than 284.5 eV. That is, when the peak of the composite wave of C1s obtained for the CoSnC-containing material is observed at the region lower than 284.5 eV, at least part of carbon contained in the CoSnC-containing material is bonded to the metal element or the metalloid element as other element.

In XPS measurement, for example, the peak of C1s is used for correcting the energy axis of spectrums. Since surface contamination carbon generally exists on the surface, the peak of C1s of the surface contamination carbon is set to in 284.8 eV, which is used as the energy reference. In XPS measurement, the waveform of the peak of C1s is obtained as a shape including the peak of the surface contamination carbon and the peak of carbon in the CoSnC-containing material. Therefore, by analyzing with the use of a commercially available software or the like, the peak of the surface contamination carbon and the peak of carbon in the CoSnC-containing material are separated. In the analysis of the waveform, the position of the main peak existing on the lowest bound energy side is set to the energy reference (284.8 eV).

As the anode active material, a carbon material such as natural graphite, artificial graphite, non-graphitizable carbon, and graphitizable carbon may be also contained. The carbon material is preferably used, since the superior cycle characteristics can be thereby obtained.

The separator 23 is made of, for example, a porous film formed of a polyolefin material such as polypropylene and polyethylene, or a porous film formed of an inorganic material such as a ceramic nonwoven. The separator 23 may have a structure in which two or more of the foregoing porous films are layered.

An electrolytic solution as a liquid electrolyte is impregnated in the separator 23. The electrolytic solution contains, for example, a solvent and a lithium salt as an electrolyte salt. The solvent is for dissolving and dissociating the electrolyte salt. As the solvent, for example, propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, ester acetate, ester butyrate, ester propionate or the like can be cited. The solvent may be used singly, or two or more thereof may be used by mixing.

As the lithium salt, for example, $LiClO_4$, $LiAsF_6$, $LiPF_6$, $LiBF_4$, $LiB(C_6H_5)_4$, $CH_3SO_3Li$, $CF_3SO_3Li$, LiCl, LiBr or the like can be cited. As the lithium salt, one of the foregoing may be used singly, or two or more thereof may be used by mixing them.

The secondary battery can be manufactured, for example, as follows.

First, a cathode active material, an electrical conductor, and a binder are mixed to prepare a cathode mixture, which is dispersed in a solvent such as N-methyl-2-pyrrolidone to form paste cathode mixture slurry. Subsequently, the cathode current collector 21A is uniformly coated with the cathode mixture slurry by using a doctor blade, a bar coater or the like, which is dried and compression-molded by a rolling press machine to form the cathode active material layer 21B and thereby forming the cathode 21.

Next, the anode active material and a binder are mixed to prepare an anode mixture, which is dispersed in a solvent such as N-methyl-2-pyrrolidone to form paste anode mixture slurry. Subsequently, the anode current collector 22A is uniformly coated with the anode mixture slurry by using a doctor blade, a bar coater or the like, which is dried and compression-molded by a rolling press machine to form the anode mixture layer 22B and thereby forming the anode 22. The rolling press machine may be used while being heated. Further, compression molding may be made several times until an intended physical value is obtained. Furthermore, a press machine other than the rolling press machine may be used.

Subsequently, the cathode lead 24 is attached to the cathode current collector 21A by welding or the like, and the anode lead 25 is attached to the anode current collector 22A by welding or the like. After that, the cathode 21 and the anode 22 are layered with the separator 23 in between, and spirally wound several times in the spirally winding direction R shown in FIG. 3 and FIG. 4 to form the planular spirally wound electrode body 20.

After that, the insulating plate 12 is arranged on the spirally wound electrode body 20, and the anode lead 25 is welded to the battery can 11. The cathode lead 24 is welded to the lower end of the cathode pin 15, and the battery cover 13 is fixed on the open end of the battery can 11 by laser welding. After that, the electrolytic solution is injected into the battery can 11 from the electrolytic solution injection hole 19, and impregnated in the separator 23. After that, the electrolytic solution injection hole 19 is sealed by the sealing member 19A. The secondary battery shown in FIG. 1 and FIG. 2 is thereby completed.

In the secondary battery 1, when charged, for example, lithium ions are extracted from the cathode 21, and are inserted in the anode 22 through the electrolytic solution impregnated in the separator 23. When discharged, lithium ions are extracted from the anode 22, and are inserted in the cathode 21 through the electrolytic solution impregnated in the separator 23. The anode active material layer 22B contains at least one of the metal elements and the metalloid elements as an element. Therefore, the relatively large capacity can be obtained as a battery. On the other hand, expansion and shrinkage are generated according to charge and discharge. However, in this embodiment, the cathode active material layer 21B is provided in the region different from the region of the cathode lead 24 in the direction of the short axis direction (direction Y) of the spirally wound electrode body 20. Therefore, deviation of the pressure distribution inside the spirally wound electrode body 20 can be prevented from being generated. Consequently, while the sufficient capacity is maintained, precipitation of lithium is prevented, and thereby the charge and discharge cycle characteristics can be improved.

In particular, when the ratio S/D between the spacing S and the distance D satisfies Conditional expression 1, the pressure distribution inside the spirally wound electrode body 20 can be close to more uniform state. Therefore, the higher capacity retention ratio can be obtained.

Second Embodiment

Figure 5:
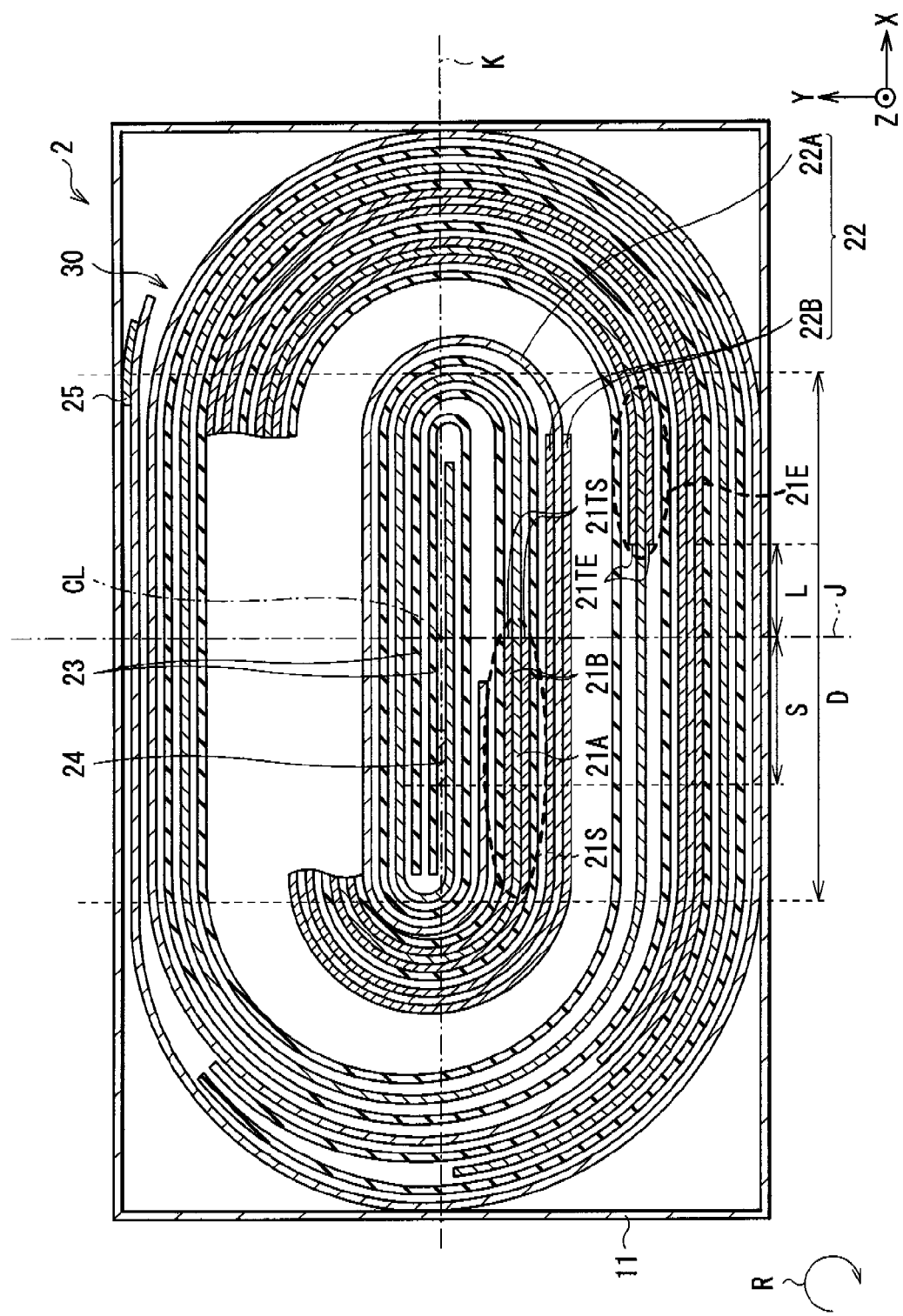
FIG. 5 is a cross section showing a structure of a secondary battery 2 according to a second embodiment of the invention.

Subsequently, a description will be given of a secondary battery 2 as a second embodiment of the invention with reference to FIG. 5. FIG. 5 shows a cross sectional structure of the secondary battery 2, and corresponds to FIG. 1 showing the secondary battery 1 in the foregoing first embodiment. The secondary battery 2 has a structure similar to that of the secondary battery 1, except that a spirally wound electrode body 30 is included instead of the spirally wound electrode body 20. Therefore, a description will be given in such a manner that elements substantially identical with those of the secondary battery 1 are affixed with the same symbol, and the description thereof will be omitted as appropriate.

As shown in FIG. 5, the spirally wound electrode body 30 is formed to match with the shape of the battery can 11 in the cross section perpendicular to the spirally winding axis CL, and is planular shape having the long axis K (direction X) and the short axis J (direction Y) that are perpendicular to each other. The spirally wound electrode body 30 is spirally wound from the spirally winding center side to the spirally winding outer circumferential side along the spirally winding direction R indicated by the arrow in FIG. 5. In the spirally wound electrode body 30, the end face 21TS on the spirally winding center side and the end face 21TE on the spirally winding outer circumferential side of the cathode active material layer 21B are located on one side of two regions divided by the long axis K perpendicular to the spirally winding axis CL. Further, the flat portion 21S having the spirally winding center side end face 21TS of the cathode active material layer 21B and a flat portion 21E having the spirally winding outer circumferential side end face 21TE of the cathode active material layer 21B do not overlap with each other in the direction of the short axis J, and extend respectively from the end face 21TS and the end face 21TE to depart from each other along the long axis K.

Therefore, the structure is made to satisfy the following expression:

$$0 \leq L/D \leq 1 \qquad 2$$

where the distance along the axis K between the end face 21TS on the spirally winding center side and the end face 21TE on the spirally winding circumferential side in the spirally wound electrode body 30 is L.

Differently from the spirally wound electrode body 20, the spirally wound electrode body 30 is formed so that the cathode active material layer 21B and the cathode lead 24 overlap with each other in the direction of the short axis J (that is, the spacing S becomes minus).

As above, in the secondary battery of this embodiment, the end face 21TS on the spirally winding center side and the end face 21TE on the spirally winding outer circumferential side of the cathode active material layer 21B are located on one side of two regions divided by the long axis K. In addition, the flat portion 21S having the spirally winding center side end face 21TS of the cathode active material layer 21B and the flat portion 21E having the spirally winding outer circumferential side end face 21TE of the cathode active material layer 21B do not overlap with each other in the direction of the short axis J. Therefore, pressure rise mainly in the region in the vicinity of the end faces 21TS, 21TE is prevented, and thus deviation of the pressure distribution inside the spirally wound electrode body 30 can be reduced. Consequently, as in the first embodiment, while the sufficient capacity is maintained, precipitation of lithium is prevented, and thereby the charge and discharge cycle characteristics can be improved.

In particular, the following Conditional expression 3 is preferably satisfied, since thereby more favorable charge and discharge cycle characteristics can be obtained:

$$0 \leq L/D \leq 0.20 \qquad 3$$

By setting $0 \leq L/D$ in the Conditional expression 3, that is, by setting the flat portion 21S and the flat portion 21E not to overlap with each other in the direction of the short axis J, a space to moderately absorb the expansion of the anode 22 can be secured. Therefore, local pressure rise can be easily avoided as described above. Meanwhile, by setting $L/D \leq 0.2$, the relatively high capacity can be secured.

Third Embodiment

Figure 6:
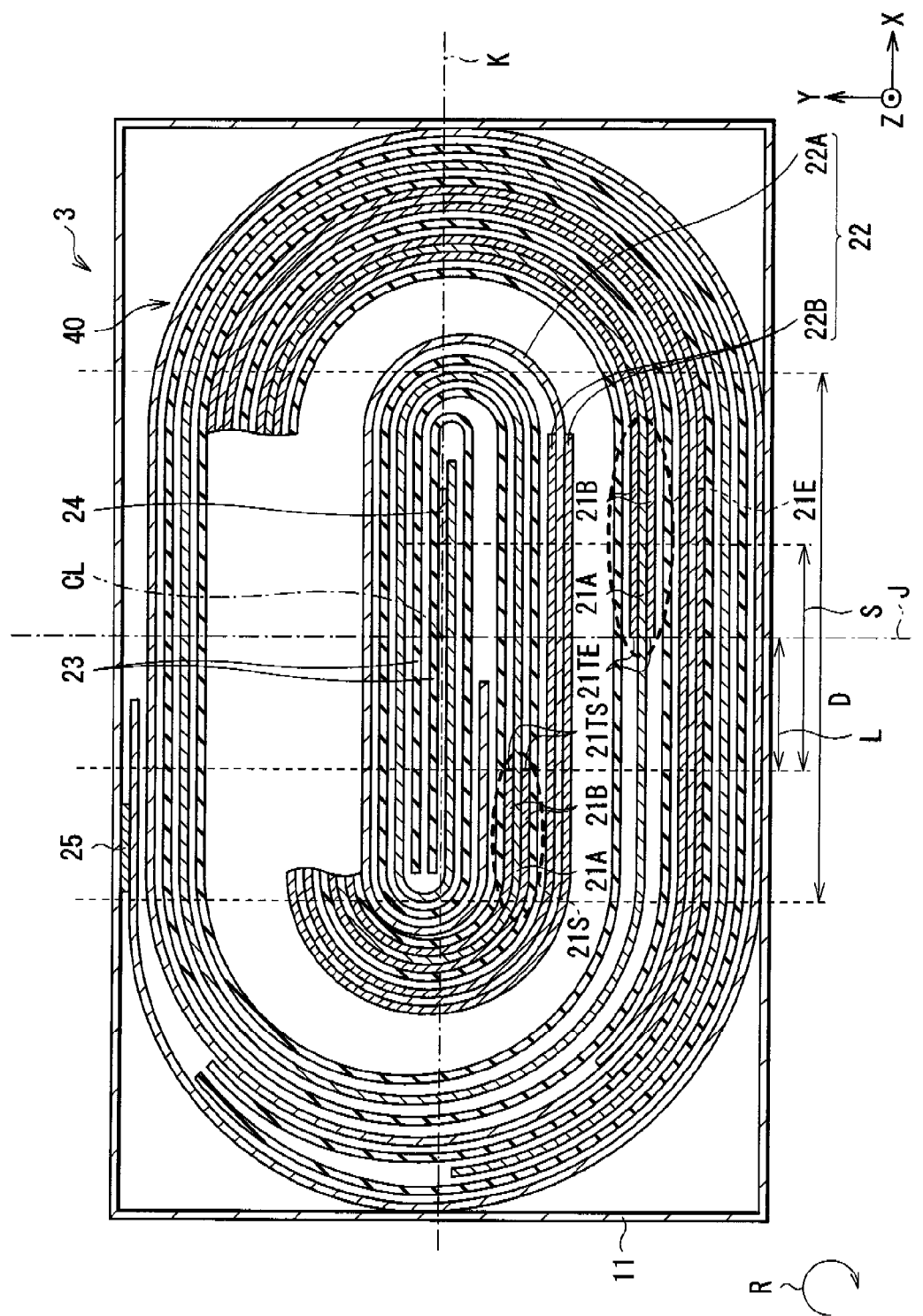
FIG. 6 is a cross section showing a structure of a secondary battery 3 according to a third embodiment of the invention.

Subsequently, a description will be given of a secondary battery 3 as a third embodiment of the invention with reference to FIG. 6. FIG. 6 shows a cross sectional structure of the secondary battery 3. The secondary battery 3 has a structure similar to that of the secondary battery 1 of the first embodiment, except that a spirally wound electrode body 40 is included instead of the spirally wound electrode body 20.

The spirally wound electrode body 40 has the both characteristics of the spirally wound electrode body 20 and the spirally wound electrode body 30. More specifically, in the spirally wound electrode body 40, the end face 21TS and the end face 21TE of the cathode active material layer 21B are located on one side of two regions divided by the long axis K. Further, the flat portion 21S and the flat portion 21E do not overlap with each other in the direction of the short axis J, and extend respectively from the end face 21TS and the end face 21TE to depart from each other along the long axis K. In addition, the flat portion 21S is provided in the region different from the region of the cathode lead 24 in the direction of the short axis J of the spirally wound electrode body 40.

Therefore, pressure distribution inside the spirally wound electrode body 40, in particular, pressure rise in the region in the vicinity of the end faces 21TS, 21TE is prevented, and thus deviation of the pressure distribution inside the spirally wound electrode body 30 can be reduced. Consequently, as in the first and the second embodiments, while the sufficient capacity is maintained, precipitation of lithium is prevented, and thereby the charge and discharge cycle characteristics can be improved. In particular, the following Conditional expression 4 is preferably satisfied, since thereby more favorable charge and discharge cycle characteristics can be obtained:

$$0 \leq L/D \leq 0.30 \qquad 4$$

By setting $0 \leq L/D$ in the Conditional expression 4, that is, by setting the flat portion 21S and the flat portion 21E not to overlap with each other in the direction of the short axis J, a space to moderately absorb the expansion of the anode 22 can be secured. Therefore, local pressure rise can be easily avoided as described above. Meanwhile, by setting $L/D \leq 0.3$, the relatively high capacity can be secured.

EXAMPLES

Further, specific examples of the invention will be described in detail.

Examples 1-1 to 1-5

The secondary batteries 1 described in the foregoing first embodiment were fabricated. First, lithium carbonate ($Li_2CO_3$) and cobalt carbonate ($CoCO_3$) were mixed at a ratio of $Li_2CO_3:CoCO_3=0.5:1$ (mol ratio). The mixture was fired for 5 hours at 900 deg C. in the air to obtain lithium cobalt complex oxide ($LiCoO_2$) as a cathode active material. Next, 91 parts by weight of the lithium cobalt complex oxide, 6 parts by weight of graphite as a conductive agent, and 3 parts by weight of polyvinylidene fluoride as a binder were mixed to prepare a cathode mixture. Subsequently, the cathode mixture was dispersed in N-methyl-2-pyrrolidone as the solvent to form cathode mixture slurry. Both faces of the cathode current collector 21A made of an aluminum foil being 20 μm thick were uniformly coated with the cathode mixture slurry, which was then dried. The resultant was compression-molded by a rolling press machine to form the cathode active material layer 21B, and thereby the cathode 21 being 225 μm thick in total was formed. Subsequently, the cathode lead 24 made of aluminum was attached to one end of the cathode current collector 21A. The cathode lead 24 being 100 μm thick and 2.5 mm wide in the extending direction of the cathode current collector 21A was used.

Further, a CoSnC-containing material was formed as an anode active material. First, as raw materials, cobalt powder, tin powder, and carbon powder were prepared. The cobalt powder and the tin powder were alloyed to form cobalt-tin alloy powder, to which the carbon powder was added and dry-blended. Subsequently, the mixture was synthesized in a planetary ball mill by using mechanochemical reaction to obtain the CoSnC-containing material.

Regarding the obtained CoSnC-containing material, the composition was analyzed. In the result, the cobalt content was 29.3 wt %, the tin content was 49.9 wt %, and the carbon content was 19.8 wt %. The carbon content was measured by a carbon sulfur analyzer. The cobalt content and the tin content were measured by ICP (Inductively Coupled Plasma) optical emission spectroscopy. Further, regarding the obtained CoSnC-containing material, X-ray diffraction was performed. In the result, the diffraction peak having the wide half bandwidth with the diffraction angle 2θ of 1.0 degree or more was observed in the range of the diffraction angle 2θ=20 to 50 degrees. Further, when XPS was performed on the CoSnC-containing material, the C1s peak in the CoSnC-containing material was obtained in the region lower than 284.5 eV. That is, it was confirmed that carbon in the CoSnC-containing material was bonded to other element.

Next, 60 parts by weight of the CoSnC-containing material, 28 parts by weight of an artificial graphite as a conductive agent and an anode active material, and 10 parts by weight of polyvinylidene fluoride as a binder were mixed to prepare an anode mixture. Subsequently, the anode mixture was dispersed in N-methyl-2-pyrrolidone as a solvent to obtain anode mixture slurry. Next, both faces of the anode current collector 22A made of a copper foil being 15 μm thick were coated with the anode mixture slurry, which was then dried. The resultant was compression-molded by a rolling press machine to form the anode active material layer 22B. Thereby the anode 22 being 87 μm thick in total was formed. After that, the anode lead 25 made of nickel was attached to one end of the anode current collector 22A. The anode lead 25 being 50 μm thick and 4.0 mm wide in the extending direction of the anode current collector 22A was used.

Subsequently, the separator 23 made of a micro porous polypropylene film being 25 μm thick was prepared. Then, the cathode 21, the separator 23, the anode 22, and the separator 23 were layered in this order to form a lamination. After that, the lamination was spirally wound several times centering on the spirally winding axis CL to form the spirally wound electrode body 20. The obtained spirally wound electrode body 20 was formed into the planular shape. The cross sectional dimensions perpendicular to the spirally winding axis CL (dimension in the long axis direction×dimension in the short axis direction) was 32 mm×6 mm.

After the spirally wound electrode body 20 was contained inside the battery can 11, the insulating plate 12 was arranged on the spirally wound electrode body 20. The anode lead 25 was welded to the battery can 11, and the cathode lead 24 was welded to the lower end of the cathode pin 15. Further, the battery cover 13 having an opening corresponding to the cathode pin 15 was arranged at the open end of the battery can 11 being caulked with the gasket 17, and then the battery cover 13 was fixed by laser welding. After that, an electrolytic solution was injected into the battery can 11 from the electrolytic solution injection hole 19. As the electrolytic solution, a solution obtained by dissolving 1 mol/dm³ of $LiPF_6$ as an electrolyte salt in a mixed solvent of 50 volume % of ethylene carbonate and 50 volume % of diethyl carbonate was used. Finally, the electrolytic solution injection hole 19 was sealed by the sealing member 19A, and thereby the square secondary battery being 8 mm thick, 34 mm wide, and 42 mm high was obtained.

Figure 10:
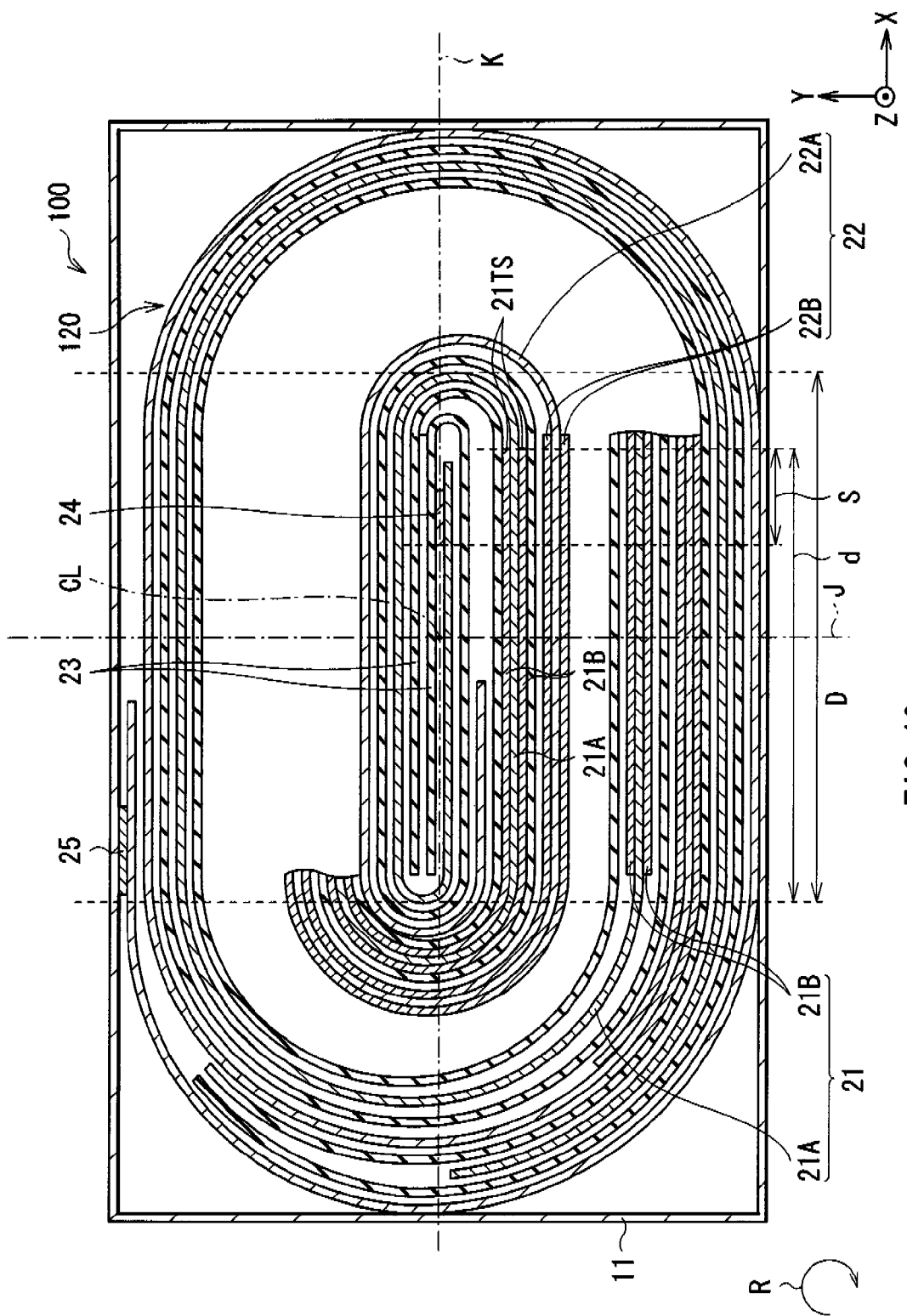
FIG. 10 is a cross section showing a structure of a secondary battery 100 corresponding to Comparative example 1-1.

When the spirally wound electrode 20 was formed, the spacing S between the end face 21TS on the spirally winding center side in the cathode active material layer 21B and the cathode lead 24 was changed. Further, the end face 21TS on the spirally winding center side and the end face 21TE on the spirally winding outer circumferential side of the cathode active material layer 21B were located on one side of the two regions divided by the long axis K. In addition, the flat portion 21S including the end face 21TS and the flat portion 21E including the end face 21TE overlapped with each other in the direction of the short axis J of the spirally wound electrode body 20. Example 1-3 corresponds to FIG. 1. Table 1 shows the ratio S/D between the spacing S and the distance D, d/D as the ratio of the distance d along the long axis K of the cathode active material layer 21B in the most inner circumference to the distance D, the initial capacity (mAh), the capacity retention ratio (%) at the 200th cycle, and the thickness ratio respectively for Examples 1-1 to 1-5. The thickness ratio represents the ratio of the thickness at the 200th cycle where the initial thickness is the reference in the spirally wound electrode body 20. Cycle test was performed in the environment of 45 deg C. in the following procedure. First, after constant current charge was performed at the current 1C until the battery voltage reached 4.2 V, constant voltage charge was performed at the constant voltage of 4.2 V until the total duration from starting charge became 2.5 hours. Next, constant current discharge was performed at the current 1 C until the battery voltage reached 2.5 V. Under the conditions that such combination of the charge and discharge was regarded as 1 cycle, charge and discharge were performed until the 200th cycle. The capacity retention ratio was calculated as the ratio of the discharge capacity at the 200th cycle to the discharge capacity at the second cycle, that is, (discharge capacity at the 200th cycle/discharge capacity at the second cycle)×100(%). 1C means the current value at which the battery capacity can be discharged in 1 hour. Table 1 also shows Comparative example 1-1 in which the cathode active material layer 21B overlapped with the cathode lead 24. The spacing S thereof is shown with the use of a minus sign. FIG. 10 is a cross section of a secondary battery 100 including a spirally wound electrode body 120 corresponding to Comparative example 1-1.

TABLE 1

| | S/D | d/D | Initial capacity (mAh) | Capacity retention ratio (%) | Thickness ratio |
|---|---|---|---|---|---|
| Comparative example 1-1 | −0.2 | 0.9 | 1402 | 64.3 | 1.13 |
| Example 1-1 | 0 | 0.7 | 1390 | 76.8 | 1.06 |
| Example 1-2 | 0.1 | 0.6 | 1385 | 78.0 | 1.03 |
| Example 1-3 | 0.2 | 0.5 | 1382 | 84.5 | 1.00 |
| Example 1-4 | 0.4 | 0.3 | 1371 | 82.2 | 1.01 |
| Example 1-5 | 0.7 | 0.0 | 1356 | 83.0 | 1.01 |

Figure 7:
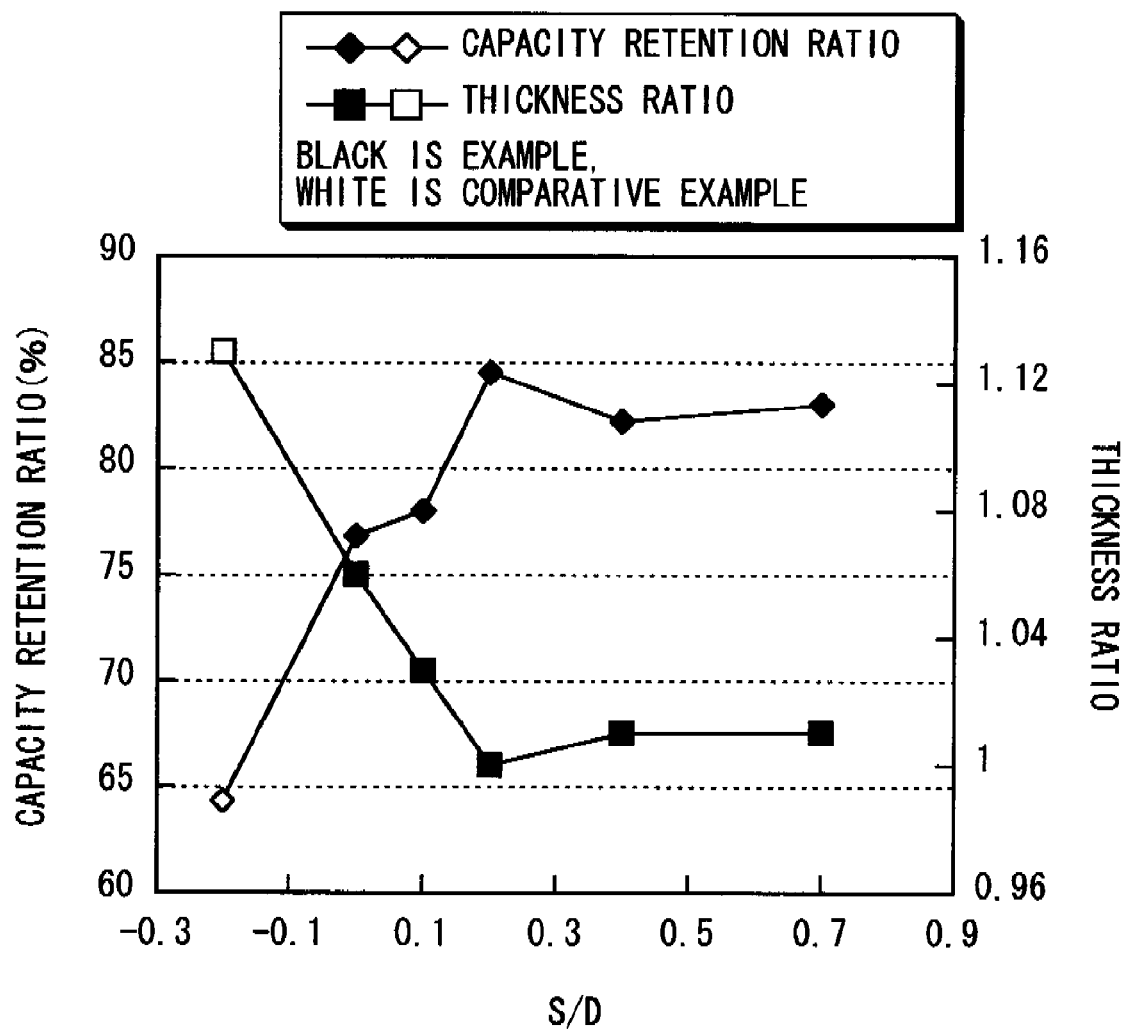
FIG. 7 is a characteristics diagram showing a relation between S/D and the capacity retention ratio and the thickness ratio in Examples 1-1 to 1-5.

Further, FIG. 7 is a graph showing the results of Table 1. FIG. 7 shows the relation between S/D and the capacity retention ratio and the thickness ratio. As shown in Table 1 and FIG. 7, in Examples 1-1 to 1-5, the superior capacity retention ratio could be obtained, and the thickness ratio to the initial thickness could be lower, compared to in Comparative example 1-1.

Examples 2-1 and 2-2

Next, the secondary batteries 2 described in the foregoing second embodiment were fabricated. That is, the secondary battery 2 was fabricated by a method similar to that of Examples 1-1 to 1-5, except that the spirally wound electrode body 30 was formed instead of the spirally wound electrode body 20, and was contained in the battery can 11.

More specifically, the end face 21TS on the spirally winding center side and the end face 21TE on the spirally winding outer circumferential side of the cathode active material layer 21B were located on one side of two regions divided by the long axis K. In addition, the flat portion 21S including the end face 21TS of the cathode active material layer 21B and the flat portion 21E including the spirally winding outer circumferential side end face 21TE of the cathode active material layer 21B extended respectively from the end face 21TS and the end face 21TE to depart from each other. The distance L then was changed. The cathode active material layer 21B and the cathode lead 24 were formed to overlap with each other in the direction of the short axis J so that the spacing S became minus. Example 2-2 corresponds to FIG. 5.

Figure 11:
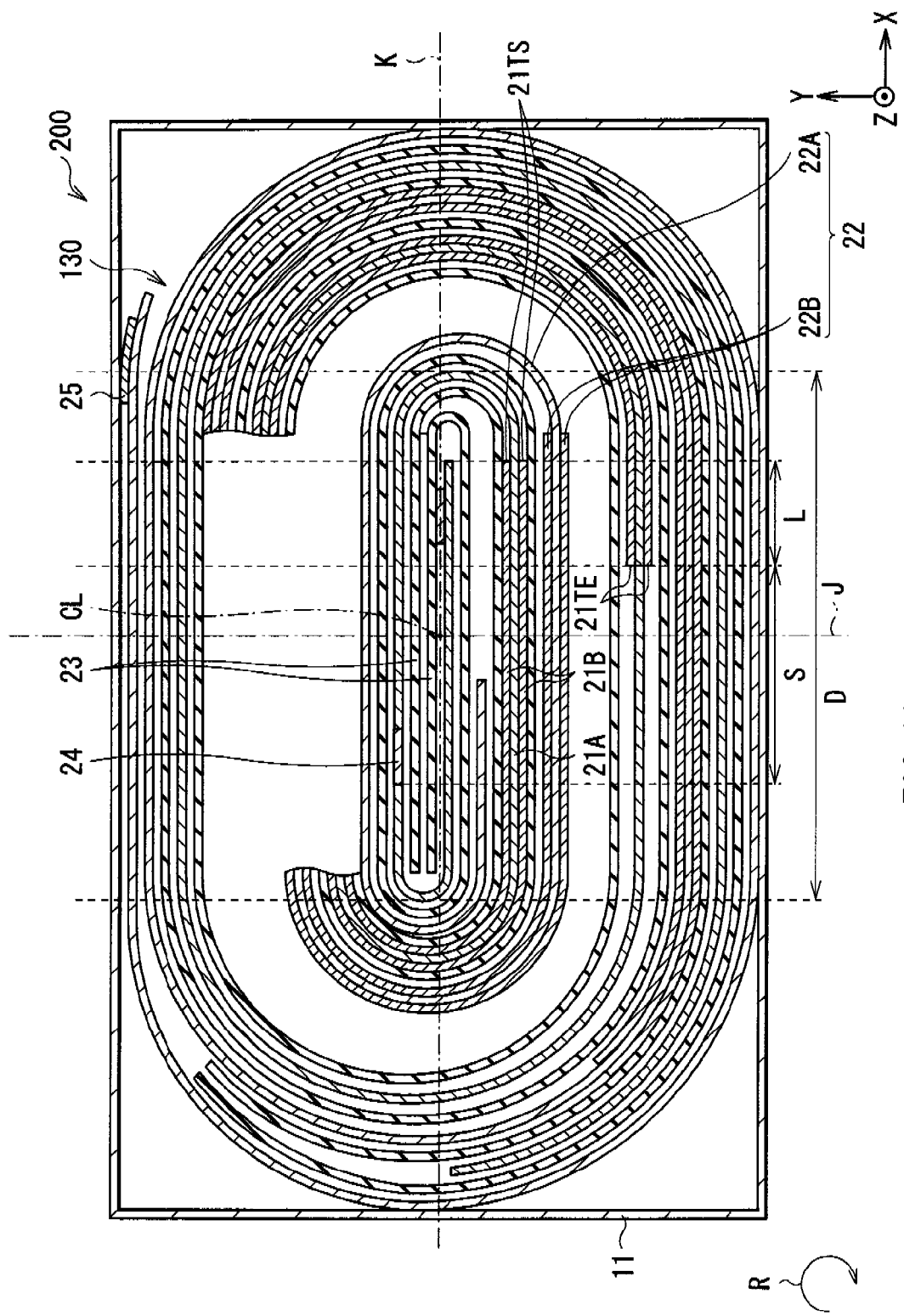
FIG. 11 is a cross section showing a structure of a secondary battery 200 corresponding to Comparative example 2-1.

Table 2 shows S/D, L/D, the initial capacity (mAh), the capacity retention ratio (%) at the 200th cycle, and the thickness ratio respectively for Examples 2-1 and 2-2. Table 2 also shows Comparative 2-1 in which the flat portion 21S and the flat portion 21E overlapped with each other in the direction of the short axis J of the spirally wound electrode body 30. L/D is shown with the use of a minus sign. FIG. 11 is a cross section of a secondary battery 200 including a spirally wound electrode body 130 corresponding to Comparative example 2-1.

TABLE 2

|  | S/D | L/D | Initial capacity (mAh) | Capacity retention ratio (%) | Thickness ratio |
|---|---|---|---|---|---|
| Comparative example 2-1 | −0.2 | −0.20 | 1339 | 61.2 | 1.13 |
| Example 2-1 | −0.2 | 0.00 | 1330 | 79.8 | 1.04 |
| Example 2-2 | −0.2 | 0.20 | 1313 | 80.5 | 1.02 |

Figure 8:
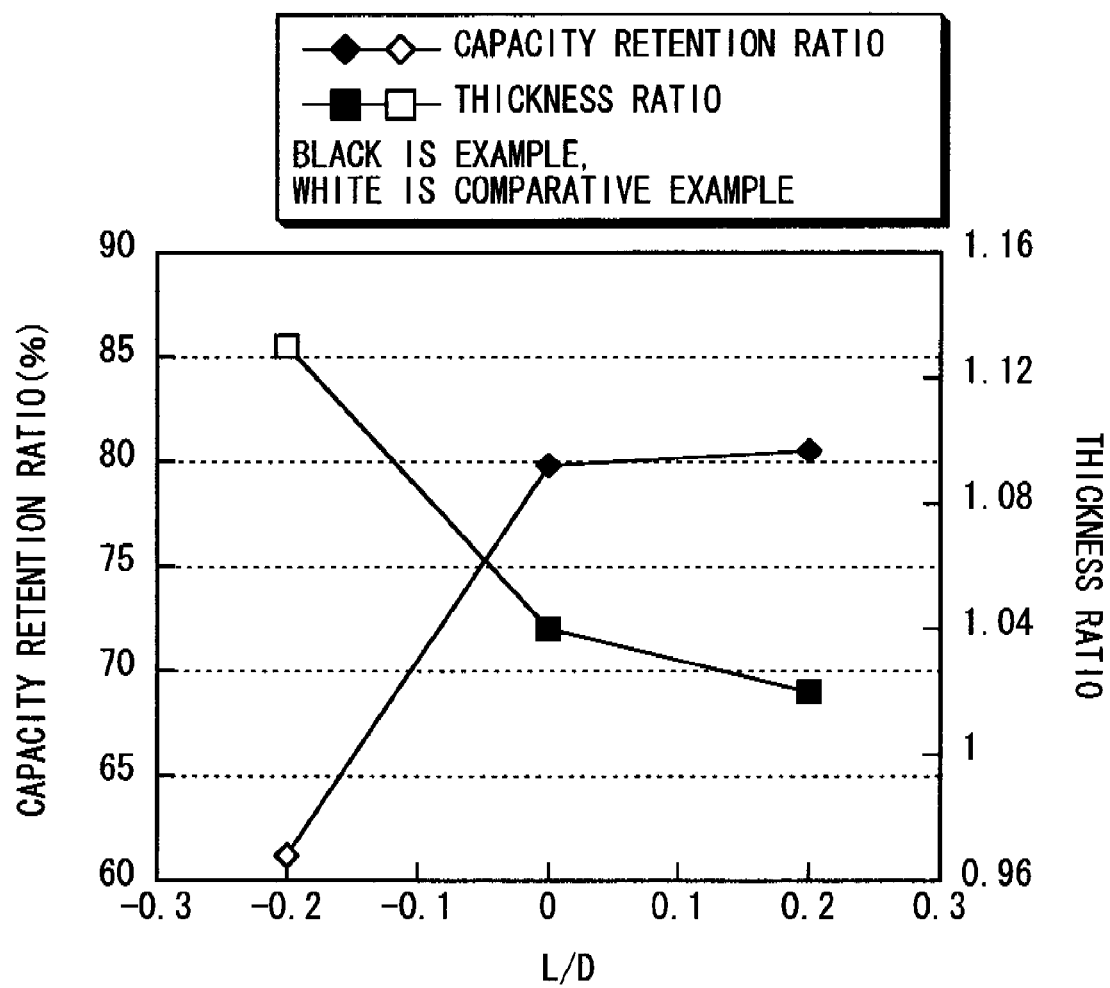
FIG. 8 is a characteristics diagram showing a relation between L/D and the capacity retention ratio and the thickness ratio in Examples 2-1 and 2-2.

Further, FIG. 8 is a graph showing the results of Table 2. FIG. 8 shows the relation between L/D as the ratio of the distance L to the distance D and the capacity retention ratio and the thickness ratio, respectively. As shown in Table 2 and FIG. 8, in Examples 2-1 and 2-2, the superior capacity retention ratio could be obtained, and the thickness ratio to the initial thickness could be lower, compared to in Comparative example 2-1.

Examples 3-1 to 3-4

Next, the secondary batteries 3 described in the foregoing third embodiment were fabricated. That is, the secondary battery 3 was fabricated by a method similar to that of Examples 1-1 to 1-5, except that the spirally wound electrode body 40 was formed instead of the spirally wound electrode body 20, and was contained in the battery can 11.

More specifically, the end face 21TS on the spirally winding center side and the end face 21TE on the spirally winding outer circumferential side of the cathode active material layer 21B were located on one side of two regions divided by the long axis K. In addition, the flat portion 21S on the spirally winding center side and the flat portion 21E on the spirally winding outer circumferential side extended respectively from the end face 21TS and the end face 21TE to depart from each other. The distance L then was changed. The spacing S between the end face 21TS and the cathode lead 24 was changed. Example 3-3 corresponds to FIG. 6.

Table 3 shows S/D, L/D, the initial capacity (mAh), the capacity retention ratio (%) at the 200th cycle, and the thickness ratio respectively for Examples 3-1 to 3-4. Table 3 also shows Comparative example 3-1 in which the flat portion 21S and the flat portion 21E overlapped with each other in the direction of the short axis J of the spirally wound electrode body 40, and the cathode active material layer 21B and the cathode lead 24 overlapped with each other.

TABLE 3

|  | S/D | L/D | Initial capacity (mAh) | Capacity retention ratio (%) | Thickness ratio |
|---|---|---|---|---|---|
| Comparative example 3-1 | 0.2 | −0.20 | 1342 | 68.3 | 1.10 |
| Example 3-1 | 0.2 | 0.00 | 1335 | 80.1 | 1.01 |
| Example 3-2 | 0.2 | 0.20 | 1327 | 85.3 | 1.00 |
| Example 3-3 | 0.2 | 0.25 | 1323 | 84.4 | 1.00 |
| Example 3-4 | 0.2 | 0.30 | 1321 | 79.0 | 1.02 |

Figure 9:
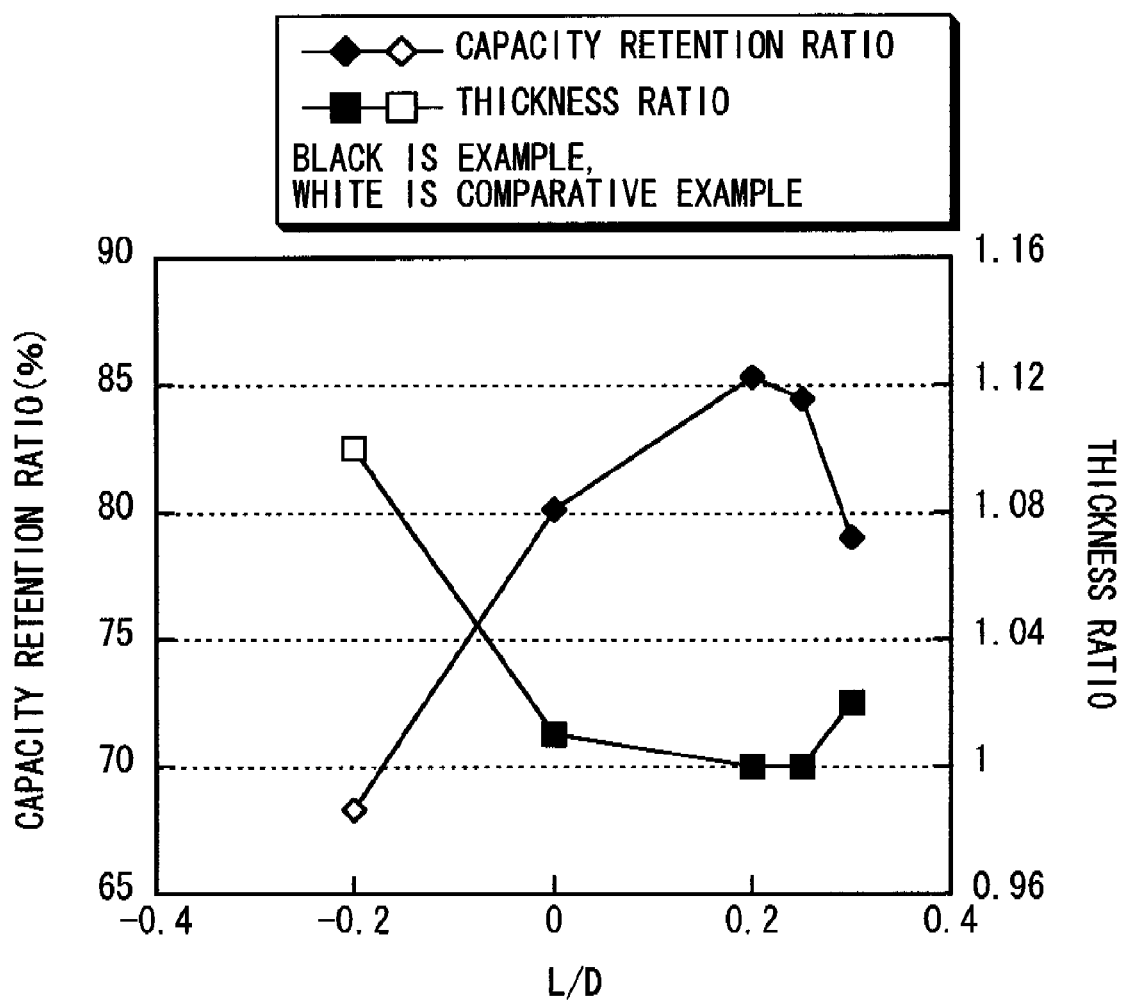
FIG. 9 is a characteristics diagram showing a relation between L/D and the capacity retention ratio and the thickness ratio in Examples 3-1 to 3-4.

Further, FIG. 9 is a graph showing the results of Table 3. FIG. 9 shows the relation between L/D and the capacity retention ratio and the thickness ratio, respectively. As shown in Table 3 and FIG. 9, in Examples 3-1 to 3-4, the superior capacity retention ratio could be obtained, and the thickness ratio to the initial thickness could be lower, compared to in Comparative example 3-1.

As described above, based on the results of Tables 1 to 3 and FIGS. 7 to 9, it was found as follows. That is, when the flat portion 21S on the spirally winding center side of the cathode active material layer 21B was provided in the region different from the region of the cathode lead 24 in the direction of the short axis J, or when the flat portion 21S on the spirally winding center side and the flat portion 21E on the spirally winding outer circumferential side of the cathode active material layer 21B did not overlap with each other, thickness change due to expansion could be prevented, and the relatively high capacity retention ratio could be secured. In particular, in Examples 3-2 and 3-3 in which S/D was 0 to 0.2 and L/D was 0.20 to 0.25, while the thickness change was prevented, the higher capacity retention ratio could be secured.

The invention has been described with reference to the embodiments and the examples. However, the invention is not limited to the foregoing embodiments and the foregoing examples, and various modifications may be made. For example, in the foregoing embodiments and the foregoing examples, the descriptions have been given of the case in which the cathode lead is jointed to the cathode current collector in the cathode exposed region on the spirally winding center side. However, the cathode lead may be jointed to the cathode current collector in the cathode exposed region on the spirally winding outer circumferential side. However, in this case, it is necessary that the anode lead is jointed to the anode current collector in the anode exposed region on the spirally winding center side, and the inner circumferential end of the cathode active material layer is provided in a region where the inner circumferential end does not overlap with the anode lead in the short axis direction of the cross section.

Further, in the foregoing embodiments and the foregoing examples, the descriptions have been given of the case using the electrolytic solution as a liquid electrolyte for the solvent. However, other electrolyte may be used instead of the electrolytic solution. As other electrolyte, for example, a gelatinous electrolyte in which the electrolytic solution is held in a polymer compound, a solid electrolyte having ion conductivity, a mixture of a solid electrolyte and an electrolytic solution, or a mixture of a solid electrolyte and a gelatinous electrolyte can be cited.

For the gelatinous electrolyte, various polymer compounds can be used as long as the polymer compound can absorb and gelate the electrolytic solution. As the polymer compound, for example, a fluorinated polymer compound such as polyvinylidene fluoride and a copolymer of vinylidene fluoride and hexafluoropropylene, an ether polymer compound such as polyethylene oxide and a cross-linked body containing polyethylene oxide, polyacrylonitrile or the like can be cited. In particular, in terms of redox stability, the fluorinated polymer compound is desirable.

As a solid electrolyte, for example, an organic solid electrolyte in which an electrolyte salt is dispersed in a polymer compound having ion conductivity, or an inorganic solid electrolyte made of ion conductive glass, ionic crystal or the like can be used. As the polymer compound, for example, an ether polymer compound such as polyethylene oxide and a cross-linked body containing polyethylene oxide, an ester polymer compound such as poly methacrylate, or an acrylate polymer compound can be used singly, by mixing, or by copolymerization in a molecule. As the inorganic solid electrolyte, lithium nitride, lithium iodide or the like can be used.

Furthermore, in the foregoing embodiments and the foregoing examples, the descriptions have been given of the case using lithium as an electrode reactant. However, the invention can be also applied to the case using other Group 1 element in the long period periodic table such as sodium (Na) and potassium (K); a Group 2 element in the long period periodic table such as magnesium and calcium (Ca); other light metal such as aluminum, or an alloy of lithium or the foregoing elements, and similar effects can be obtained. Then, for an anode active material and a cathode active material capable of inserting and extracting an electrode reactant, a solvent or the like can be selected according to the electrode reactant.

It should be understood by those skilled in the art that various modifications, combinations, sub-combinations and alternations may occur depending on design requirements and other factors insofar as they are within the scope of the appended claims or the equivalents thereof.

What is claimed is:

1. A secondary battery comprising:
a spirally wound electrode body in which a cathode having a cathode active material layer on a strip-shaped cathode current collector and an anode having an anode active material layer on a strip-shaped anode current collector are layered with a separator in between, and spirally wound in a planular state; and
a lead joined to the cathode current collector in a center portion of the spirally wound electrode body,
wherein,
the anode active material layer includes at least one of tin (Sn) and silicon (Si),
a spirally winding center side end of the cathode active material layer is provided in a region where the spirally winding center side end does not overlap with the cathode lead in a short axis direction of the spirally wound electrode body,
a spirally winding center side of the anode active material layer is provided in a region where the spirally winding center side end overlaps with the cathode lead in a short axis direction of the spirally wound electrode body, and
the spirally wound electrode body is structured so that the spirally winding center side end and a spirally winding outer circumferential side end of the cathode active material layer and the spirally winding center side end of the anode active material layer are located on one side of two regions divided by a long axis, and a flat portion having the spirally winding center side end of the cathode active material layer and a flat portion having the spirally winding outer circumferential side end of the cathode active material layer do not overlap with each other in a short axis direction.

2. The secondary battery according to claim 1, wherein the anode active material contains a CoSnC-containing material that contains tin (Sn), cobalt (Co), and carbon (C) in which a carbon content is from 9.9 wt % to 29.7 wt %, and a ratio of cobalt to a total of tin and cobalt is from 30 wt % to 70 wt %.

3. The secondary battery according to claim 1 or 2, wherein the following conditional expression is satisfied:

$$0 \leq L/D \leq 0.3,$$

where L is a distance in the long axis direction between the spirally winding center side end of the cathode active material layer, and D is a distance along the long axis direction from the center line to the most inner turn of the cathode current collector winding.

4. The secondary battery according to claim 1 or 2, wherein the spirally wound electrode body is contained in a battery can in the shape of a rectangular parallelepiped.

5. The secondary battery according to claim 1, wherein the following conditional expression is satisfied:

$$0 \leq S/D \leq 0.7,$$

where S is a spacing along the long axis direction between the cathode lead and the spirally winding center side end of the cathode active material layer, and D is a distance along the long axis direction from center line to the most inner turn of the cathode current collector winding.

6. The secondary battery according to claim 1, wherein another lead is jointed to the anode current collector in an outer circumferential portion of the spirally wound electrode body.

7. The secondary battery according to claim 1, wherein the anode active material layer contains at least one of a metal element and a metalloid element capable of inserting and extracting an electrode reactant.

8. The secondary battery according to claim 1, wherein the cathode current collector is coated on oppositely facing surfaces with the cathode active material layer.

9. The secondary battery according to claim 1, wherein the cathode current collector is coated on oppositely facing surfaces with the cathode active material layer, and the anode current collector is coated on oppositely facing surfaces with the anode active material layer.

* * * * *